(12) United States Patent
Matsumoto et al.

(10) Patent No.: US 8,817,107 B2
(45) Date of Patent: Aug. 26, 2014

(54) IMAGING DEVICE, IMAGING DEVICE CONTROL METHOD AND PROGRAM

(75) Inventors: Takuya Matsumoto, Kanagawa (JP); Xiaobo Zhou, Shanghai (CN); Yuanyuan Pan, Shanghai (CN); Li Li, Shanghai (CN)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 12/931,543

(22) Filed: Feb. 3, 2011

(65) Prior Publication Data
US 2011/0193967 A1 Aug. 11, 2011

(30) Foreign Application Priority Data

Feb. 10, 2010 (JP) ................................ P2010-028041

(51) Int. Cl.
*H04N 5/33* (2006.01)
*H04N 5/235* (2006.01)
*H04N 5/232* (2006.01)
*G03B 7/18* (2006.01)
*H04N 5/225* (2006.01)

(52) U.S. Cl.
CPC ................ *G03B 7/18* (2013.01); *H04N 5/2352* (2013.01); *H04N 5/23245* (2013.01); *H04N 5/2254* (2013.01)
USPC ........................................................ 348/164

(58) Field of Classification Search
USPC ................................................... 348/164, 365
See application file for complete search history.

(56) References Cited

U.S. PATENT DOCUMENTS

| 3,748,383 | A  | * | 7/1973  | Grossman ...................... 348/164 |
| 6,249,311 | B1 | * | 6/2001  | Rouse, Jr. et al. ............. 348/164 |
| 2010/0295946 | A1 | * | 11/2010 | Reed et al. ..................... 348/164 |
| 2010/0309315 | A1 | * | 12/2010 | Hogasten et al. ............. 348/164 |

FOREIGN PATENT DOCUMENTS

JP    2004-120202 A    4/2004

* cited by examiner

*Primary Examiner* — Sath V Perungavoor
*Assistant Examiner* — Kate Luo
(74) *Attorney, Agent, or Firm* — Sony Corporation

(57) ABSTRACT

An imaging device that includes a control unit is provided. The control unit switches between a day mode and a night mode. In the day mode, image capture is performed while an infrared cut filter is placed on an optical path, and in the night mode, image capture is performed while the infrared cut filter is removed from the optical path. Immediately after shifting from the day mode to the night mode, in the night mode, as the amount of incident light decreases, the control unit increases an irradiation intensity of an infrared irradiation portion from zero while a gain is maintained at a first gain value. When the amount of the incident light further decreases after the irradiation intensity reaches a maximum, the control portion increases the gain from the first gain value.

17 Claims, 10 Drawing Sheets

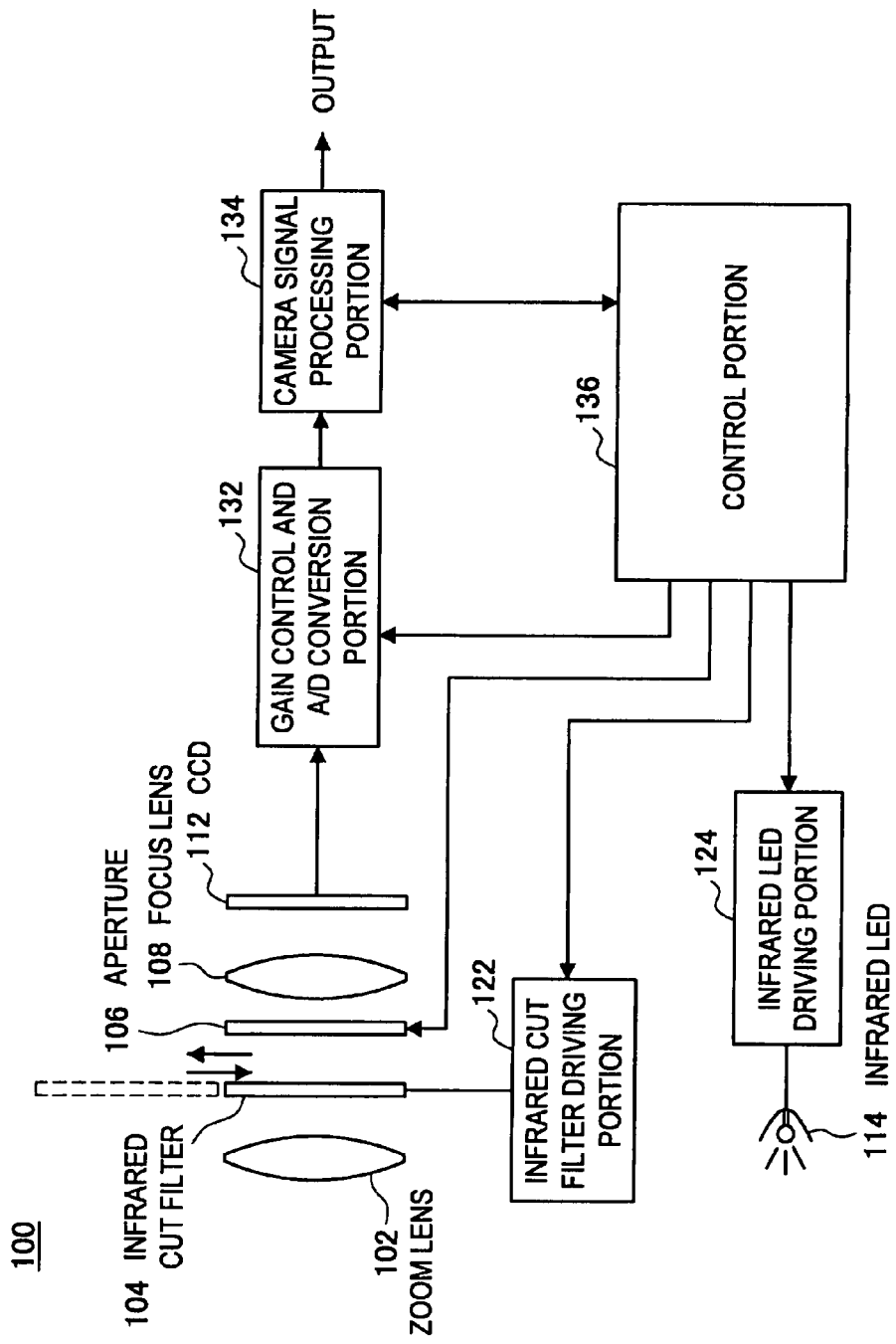

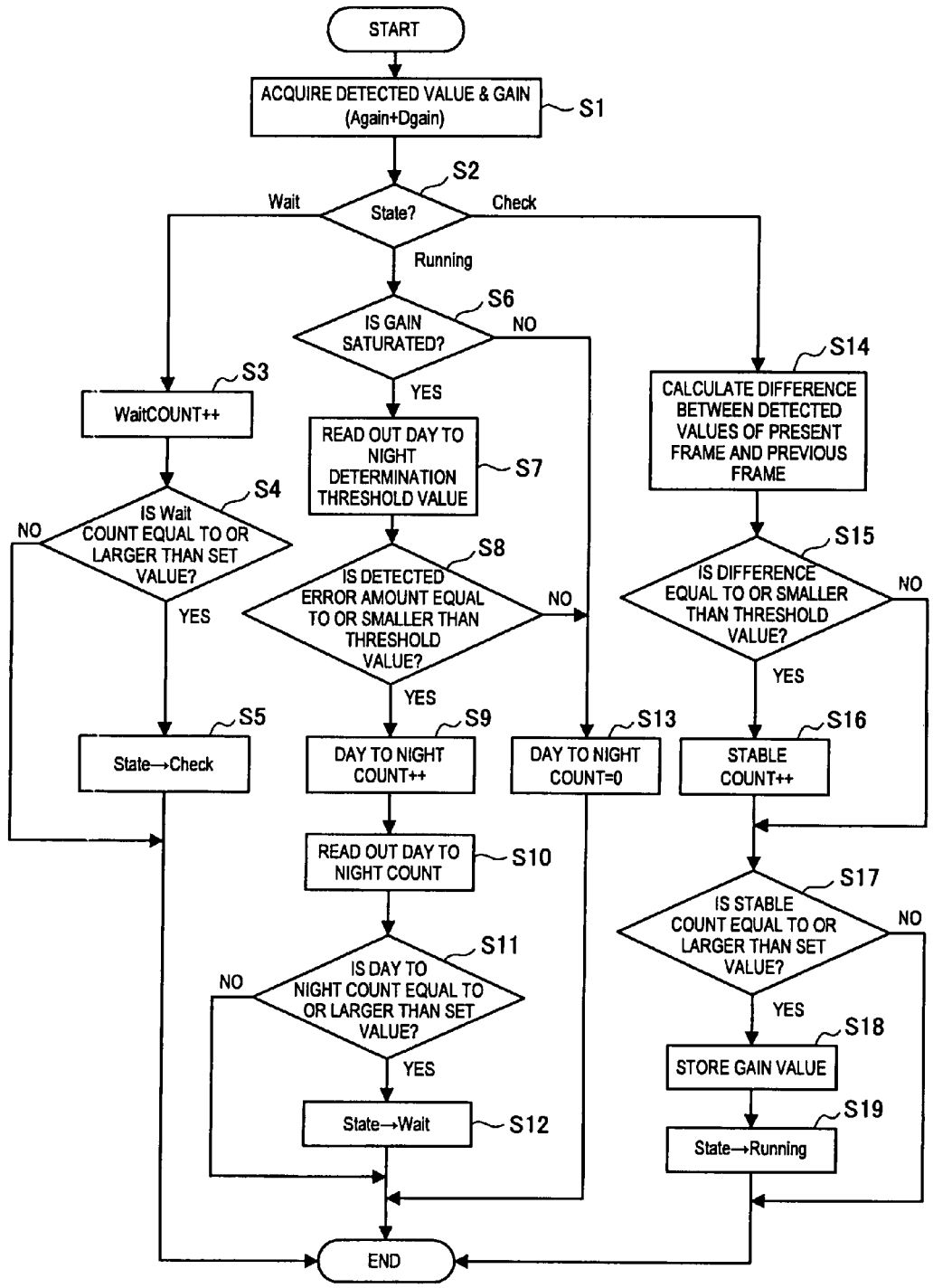

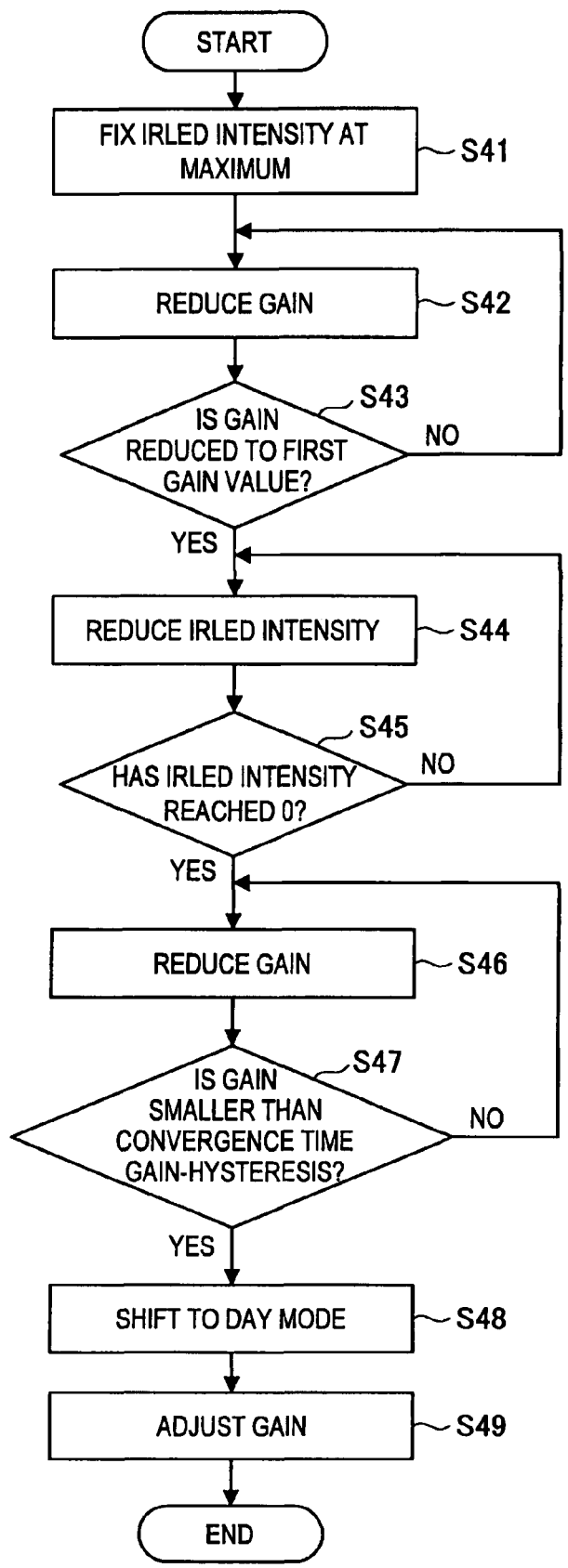

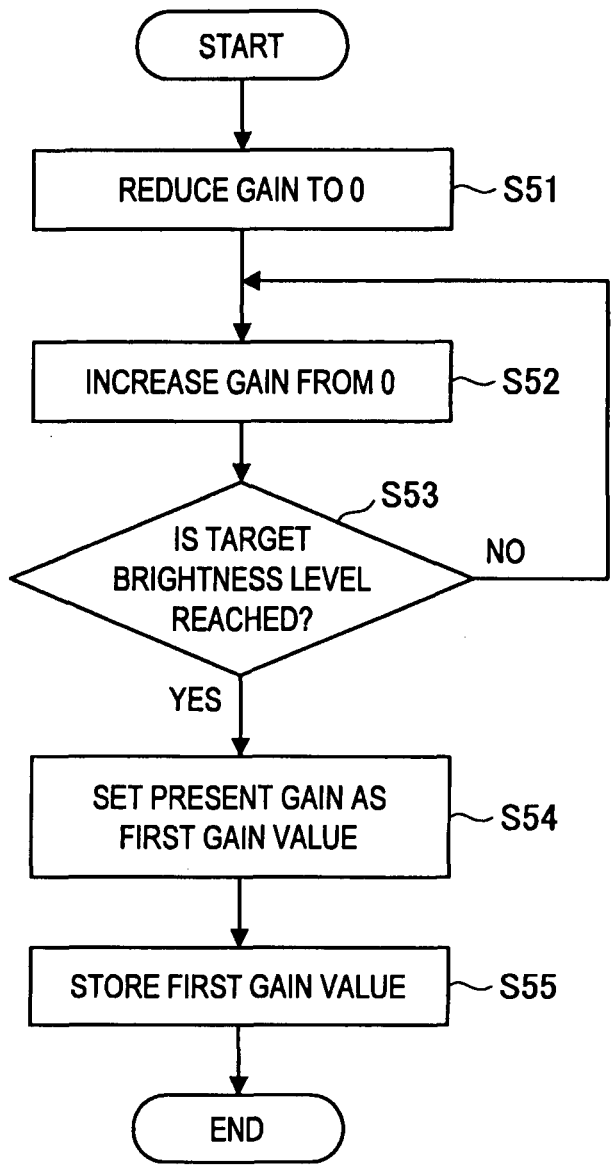

IMAGING DEVICE, IMAGING DEVICE CONTROL METHOD AND PROGRAM

CROSS-REFERENCE TO RELATED APPLICATION

The present application claims priority from Japanese Patent Application No. JP 2010-028041 filed in the Japanese Patent Office on Feb. 10, 2010, the entire content of which is incorporated herein by reference.

BACKGROUND OF THE INVENTION

1. Field of the Invention

The present invention relates to an imaging device, an imaging device control method and a program.

2. Description of the Related Art

Imaging devices (such as a video camera, a digital still camera and the like) that can capture infrared light are known. When an imaging device that can capture infrared light is used for image capture, during daylight hours when the image capture environment is bright, an infrared cut filter is attached to a stage preceding a charge coupled device (CCD) image sensor and image capture is performed. On the other hand, during night hours when the image capture environment is dark, the infrared cut filter is removed from an optical path and image capture is performed. The infrared cut filter is removed or attached to perform image capture, so that the amount of incident light that enters the CCD image sensor is increased or decreased.

Japanese Patent Application Publication No. JP-A-2004-120202 discloses a technology that switches between two image capture modes, namely, between a day mode in which the infrared cut filter is attached to perform image capture, and a night mode in which the infrared cut filter is removed to perform image capture.

SUMMARY OF THE INVENTION

An imaging device is known that performs image capture by controlling a gain in accordance with the brightness of an image capture environment, and thereby performs adjustment such that the obtained subject image has an appropriate brightness. Then, based on a gain value or a detected luminance value, the imaging device that can capture infrared light switches between the day mode in which the infrared cut filter is attached to perform image capture and the night mode in which the infrared cut filter is removed to perform image capture.

When only the gain is adjusted such that the brightness level of an image can reach a target brightness level, the gain increases as the image capture environment becomes darker, regardless of whether the image capture mode is the day mode or the night mode. As a result, when the image capture environment becomes dark, a signal-to-noise (S/N) ratio of the image obtained by image capture deteriorates.

An imaging device is known that has an infrared irradiation function that irradiates infrared light onto a subject, and captures the subject that reflects the infrared light. The subject can be captured more reliably during night hours by irradiating infrared light. The imaging device with the infrared irradiation function performs image capture by controlling a gain and infrared irradiation intensity in accordance with the brightness of an image capture environment, and thereby performs adjustment such that the obtained subject image has an appropriate brightness.

However, in the control of the gain and the infrared irradiation intensity in the night mode, if an image is captured by increasing the gain such that the gain is given priority, the S/N ratio of the image obtained by the image capture deteriorates. On the other hand, if an image is captured in the night mode by increasing the infrared irradiation intensity such that it is given priority over the gain, there are cases in which, when a person stands in front of the imaging device after a shift to the night mode, the image capture mode returns to the day mode due to an increase in the amount of light reflected from the subject, and after the person leaves, the image capture mode shifts to the night mode again. In this manner, the day mode and the night mode are repeated and an operation of the imaging device becomes unstable.

In light of the foregoing, it is desirable to provide an imaging device, an imaging device control method and a program that are novel and improved and that are capable of removing an infrared cut filter from an optical path and improving an S/N ratio of an image in a night mode in which infrared light is irradiated onto a subject.

According to an embodiment of the present invention there is provided an imaging device including: an imaging element that receives light from a subject and converts the light to an electrical signal; an infrared cut filter which is detachably provided on an optical path that connects the subject and the imaging element, and which removes an infrared region of light entering the imaging element; an infrared irradiation portion that irradiates infrared light onto the subject; a gain control portion that controls a gain such that an image has a target brightness, based on an amount of incident light entering the imaging element; and a control portion which switches between a day mode, in which image capture is performed while the infrared cut filter is placed on the optical path, and a night mode, in which image capture is performed while the infrared cut filter is removed from the optical path, and which, immediately after shifting from the day mode to the night mode, increases an irradiation intensity of the infrared irradiation portion from zero while the gain is maintained at a first gain value, as the amount of the incident light decreases in the night mode, and which increases the gain from the first gain value when the amount of the incident light further decreases after the irradiation intensity reaches a maximum.

In the night mode, as the amount of the incident light increases, the control portion may decrease the gain while the irradiation intensity of the infrared irradiation portion is maintained at the maximum, and when the amount of the incident light further increases after the gain reaches the first gain value, the control portion may decrease the irradiation intensity from the maximum to zero while the gain is maintained at the first gain value.

In the night mode, when the amount of the incident light further increases after the irradiation intensity becomes zero, the control portion may decrease the gain to a value obtained by subtracting hysteresis from the first gain value.

The control portion may switch from the day mode to the night mode if two conditions are satisfied, the two conditions being that the gain is saturated and that the amount of the incident light is smaller than a value determined in advance.

The control portion may switch from the night mode to the day mode when the gain decreases and becomes smaller than a value obtained by subtracting hysteresis from the first gain value.

According to another embodiment of the present invention, there is provided an imaging device control method, including the steps of: switching between a day mode in which image capture is performed while an infrared cut filter, which is detachably provided on an optical path that connects a subject and an imaging element and which removes an infrared region of light entering the imaging element, is placed on the optical path that connects the imaging element and the subject, and a night mode in which image capture is performed while the infrared cut filter is removed from the optical path; increasing from zero, immediately after shifting from the day mode to the night mode, an irradiation intensity of an infrared irradiation portion that irradiates infrared light onto the subject while a gain is maintained at a first gain value, as an amount of incident light entering the imaging element decreases in the night mode, the gain controlling brightness of an image based on the amount of the incident light; and increasing the gain from the first gain value when the amount of the incident light further decreases after the irradiation intensity reaches a maximum.

According to another embodiment of the present invention, there is provided a program that includes instructions that command a computer to function as: a switching unit that switches between a day mode in which image capture is performed while an infrared cut filter, which is detachably provided on an optical path that connects a subject and an imaging element and which removes an infrared region of light entering the imaging element, is placed on the optical path that connects the imaging element and the subject, and a night mode in which image capture is performed while the infrared cut filter is removed from the optical path; a first increasing unit that increases from zero, immediately after shifting from the day mode to the night mode, an irradiation intensity of an infrared irradiation portion that irradiates infrared light onto the subject while a gain is maintained at a first gain value, as an amount of incident light entering the imaging element decreases in the night mode, the gain controlling brightness of an image based on the amount of the incident light; and a second increasing unit that increases the gain from the first gain value when the amount of the incident light further decreases after the irradiation intensity reaches a maximum.

According to the present invention described above, it is possible to remove the infrared cut filter from the optical path and to improve the S/N ratio of an image in the night mode in which infrared light is irradiated onto a subject.

BRIEF DESCRIPTION OF THE DRAWINGS

FIG. 1 is a block diagram showing an imaging device 100 according to an embodiment of the present invention;

FIG. 3 is a flowchart showing a determination operation for a shift from a day mode to a night mode of the imaging device 100;

FIG. 6 is a flowchart showing operations of the gain and the infrared LED 114 when shifting from the night mode to the day mode;

FIG. 7 is a flowchart showing gain control after the shift from the day mode to the night mode;

DETAILED DESCRIPTION

Figure 2A:
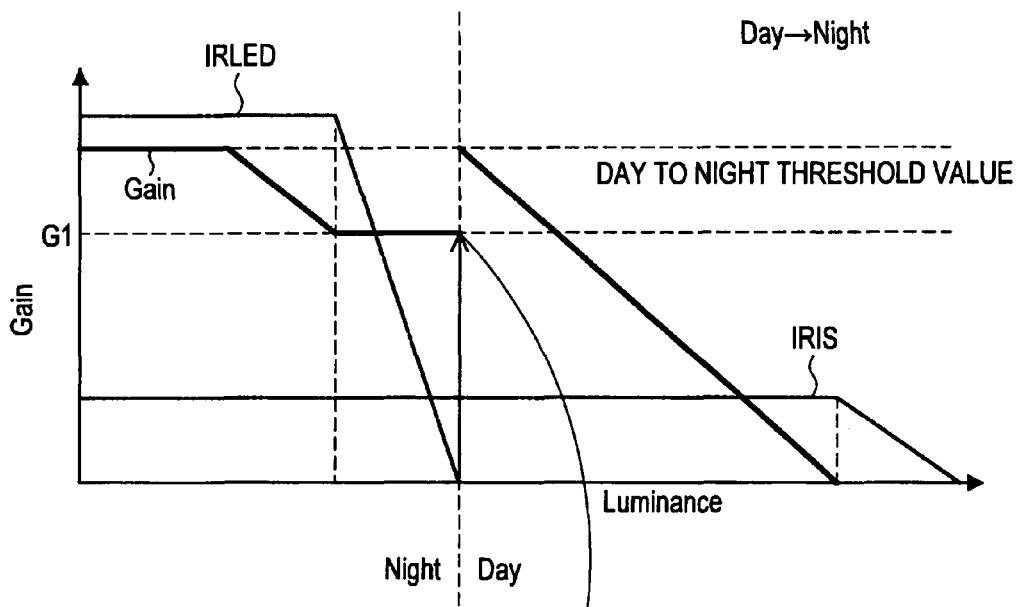
FIG. 2A and FIG. 2B are graphs each showing a relationship between a gain, an infrared LED 114 and an aperture 106, and a luminance.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Configuration of embodiment
2. Operations of embodiment
3. Advantageous effects of embodiment
1. Configuration of Embodiment First, a configuration of an imaging device 100 according to an embodiment of the present invention will be explained with reference to FIG. 1. FIG. 1 is a block diagram showing the imaging device 100 according to the present embodiment.

The imaging device 100 is, for example, a video camera or the like that captures moving images. The imaging device 100 captures a subject in two modes, i.e., a day mode and a night mode. In the day mode, an infrared cut filter 104 is placed on an optical path and a visible light region is captured mainly during daylight hours. In the night mode, the infrared cut filter 104 is removed from the optical path and an infrared region is captured mainly during night hours.

The imaging device 100 includes, for example, a zoom lens 102, the infrared cut filter 104, an aperture (or iris) 106, a focus lens 108, a CCD image sensor 112, an infrared LED 114, an infrared cut filter driving portion 122, an infrared LED driving portion 124, a gain control and A/D conversion portion 132, a camera signal processing portion 134, a control portion 136 and the like.

The zoom lens 102 increases or decreases the angle of view by changing a lens focal distance. The infrared cut filter 104 removes infrared light from incident light, and emits light from which the infrared light has been removed. The aperture 106 adjusts brightness by changing the amount of light. The focus lens 108 forms a subject image on the CCD image sensor 112, and performs adjustment such that an image comes into focus.

The infrared cut filter 104 is placed on an optical path that connects a subject and the CCD image sensor 112 or is removed from the optical path by the infrared cut filter driving portion 122. The infrared cut filter driving portion 122 is controlled by the control portion 136.

In the imaging device 100, light from the subject is irradiated onto the CCD image sensor 112 via the zoom lens 102, the infrared cut filter 104, the aperture 106 and the focus lens 108. The CCD image sensor 112 can capture the visible light region and the infrared region. The CCD image sensor 112 converts the irradiated incident light to an electrical signal and outputs the electrical signal to the gain control and A/D conversion portion 132. Since the CCD image sensor 112 has sensitivity to the infrared region, the imaging device 100 can perform image capture even in a dark place.

The gain control and A/D conversion portion 132 amplifies an image signal received from the CCD image sensor 112 and digitalizes it. Then, the gain control and A/D conversion portion 132 outputs the gain-controlled and digitalized image signal to the camera signal processing portion 134.

The camera signal processing portion 134 performs signal processing on the input image signal, the signal processing including, for example, color separation, contour correction and the like. The color separation is performed such that a luminance signal and a color difference signal are generated from the image signal, and primary color signals (i.e., R, G and B signals) are separated from the generated luminance signal and color difference signal. The contour correction is performed such that the contour of the subject is enhanced. Further, the camera signal processing portion 134 detects the brightness of the image signal and outputs a detection result to the control portion 136.

The infrared LED 114 irradiates infrared light. The infrared LED 114 is subjected to ON/OFF control and irradiation intensity control by the infrared LED driving portion 124, and the infrared LED 114 starts and ends the irradiation of infrared light or changes the irradiation intensity. Even in a dark image capture environment during night hours, image capture can be performed under bright conditions by the infrared LED 114 irradiating infrared light onto a subject. As a result, the infrared region can be captured more reliably.

The control portion 136 is a microcomputer, for example, and performs arithmetic processing and control of various types of structural elements. The control portion 136 controls, for example, the infrared cut filter 104, the infrared LED 114, the aperture 106 and the like. Further, the control portion 136 controls the gain control and A/D conversion portion 132 using a gain control signal. Further, the control portion 136 performs communication with the camera signal processing portion 134 and controls the camera signal processing portion 134. The control portion 136 switches between the day mode and the night mode based on a detected value received from the camera signal processing portion 134.

2. Operations of Embodiment

Next, operations of the imaging device 100 according to the present embodiment will be explained.

Shift from Day Mode to Night Mode

Figure 2B:
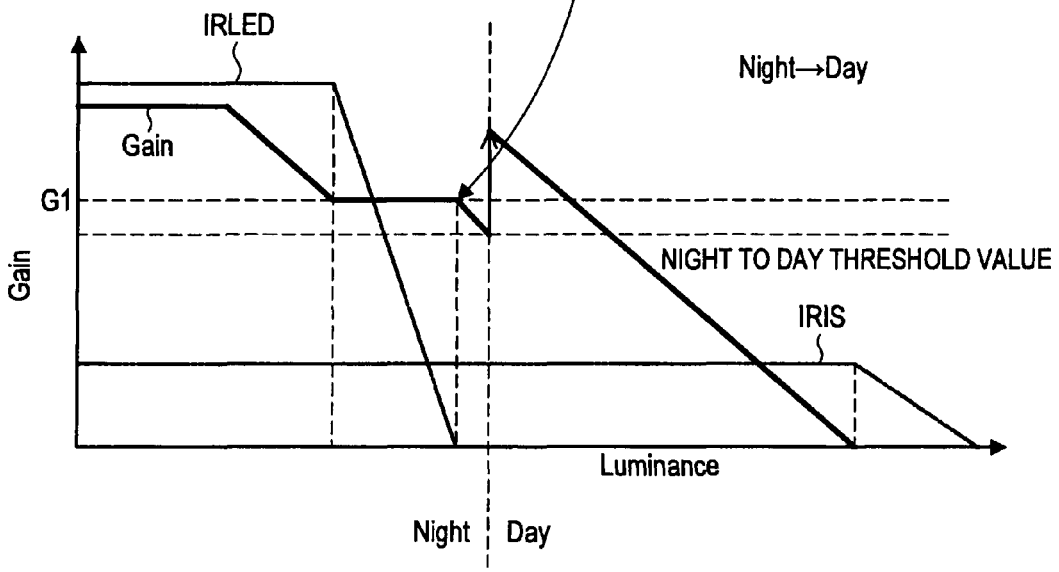
Figure 5:
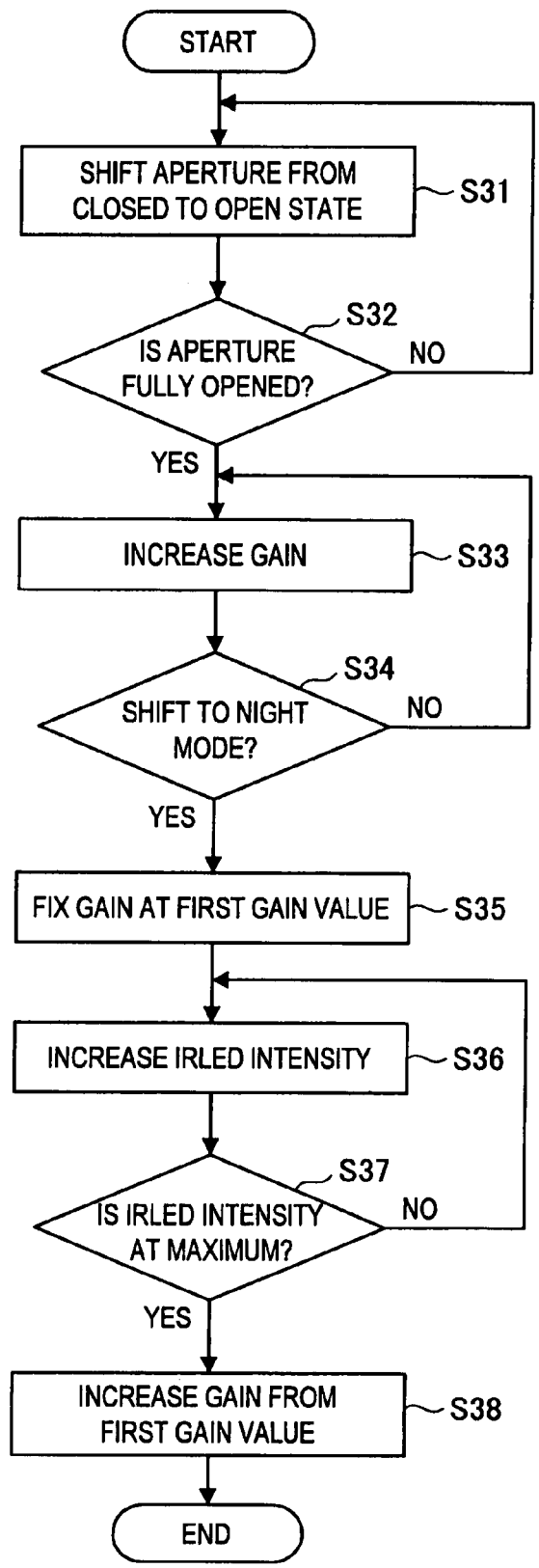
FIG. 5 is a flowchart showing operations of the aperture 106, the gain and the infrared LED 114 when shifting from the day mode to the night mode.

First, operations of the aperture 106, a gain and the infrared LED 114 when shifting from the day mode to the night mode will be explained with reference to FIG. 2A and FIG. 5. FIG. 2A and FIG. 2B are graphs each showing a relationship between the gain, the infrared LED 114 and the aperture 106, and a luminance. FIG. 2A shows switching from the day mode to the night mode. FIG. 5 is a flowchart showing operations of the aperture 106, the gain and the infrared LED 114 when shifting from the day mode to the night mode.

First, the aperture 106 is shifted from a closed state to an open state so that the brightness level of an image reaches a target brightness level, as the image capture environment becomes darker (step S31). Control by the aperture 106 is continued until the aperture 106 is fully opened (step S32).

After the aperture 106 is fully opened, the brightness of the image is adjusted by the gain. When the image capture environment becomes dark, the imaging device 100 increases the gain (step S33). If the gain is saturated and a predetermined period of time has elapsed, the mode shifts from the day mode to the night mode (step S34).

A value at which the mode shifts to the night mode and the gain is stabilized is stored as a first gain value G1. After that, if the image capture environment becomes even darker, while the gain is fixed at the first gain value G1 (step S35), the irradiation intensity of the infrared LED 114 is increased from 0 (step S36). The irradiation intensity of the infrared LED 114 is increased until the irradiation intensity reaches a maximum (step S37). Since the subject is captured by irradiation from the infrared LED 114 without increasing the gain, it is possible to improve an S/N ratio of an image.

When the irradiation intensity of the infrared LED 114 reaches the maximum, if the image capture environment is still dark, the gain is increased from the first gain value G1 (step S38). The gain is increased until the gain is saturated and reaches a maximum.

Gain Control Performed when Shifting to Night Mode

Here, gain control performed when shifting from the day mode to the night mode will be explained with reference to FIG. 7. FIG. 7 is a flowchart showing the gain control after the shift from the day mode to the night mode.

As described above, if the image capture environment becomes dark in the day mode, and if the gain is saturated and the predetermined period of time has elapsed, the mode shifts from the day mode to the night mode. In the night mode, the infrared cut filter 104 is removed from the optical path.

Then, at a point in time at which the mode shifts to the night mode, the gain is temporarily reduced to 0 (step S51). Next, the gain is increased from 0 (step S52), and the gain is adjusted such that the brightness level of the image reaches a target brightness level (step S53). In the night mode, since infrared light enters the CCD image sensor 112, the amount of incident light increases as compared to that in the day mode and the gain decreases accordingly.

A present gain when the brightness level of the image reaches the target brightness level and the gain is stabilized is set as the first gain value G1 (step S54). Then, the first gain value G1 is stored (step S55).

Shift from Night Mode to Day Mode

Next, operations of the gain and the infrared LED 114 when shifting from the night mode to the day mode will be explained with reference to FIG. 2B and FIG. 6. FIG. 2B shows switching from the night mode to the day mode. FIG. 6 is a flowchart showing operations of the gain and the infrared LED 114 when shifting from the night mode to the day mode.

In the night mode, at a point in time when the image capture environment is dark and a detected value (luminance) is low, the irradiation intensity of the infrared LED 114 is at a maximum and the gain is saturated. After that, as the detected value increases, first, instead of reducing the irradiation intensity of the infrared LED 114, while the irradiation intensity of the infrared LED 114 is fixed at the maximum (step S41), the gain is reduced in accordance with the brightness of the image capture environment (step S42). Since the gain is reduced and the subject is captured by irradiation from the infrared LED 114, it is possible to improve the S/N ratio of the image.

Next, it is determined whether or not the present gain is reduced to the first gain value G1 stored at the time of the shift to the night mode (step S43). When the present gain is reduced to the first gain value G1, the irradiation intensity of the infrared LED 114 is gradually reduced from the maximum (step S44). During this time, the gain is fixed at the first gain value G1. Then, until the irradiation intensity of infrared light reaches 0, the irradiation intensity of the infrared LED 114 is reduced in accordance with the brightness of the image capture environment (step S45).

If the image capture environment is still bright when the irradiation intensity of the infrared LED 114 reaches 0, the gain is reduced (step S46). Then, it is determined whether or not the present gain is reduced to a value (namely, a night to day threshold value of the gain) that is obtained by subtracting hysteresis from the stored gain in convergence time (namely, the first gain value G1 at the time of the shift to the night mode) (step S47). When the present gain is reduced and becomes smaller than the night to day threshold value and a certain period of time elapses, the mode shifts from the night mode to the day mode (step S48).

In response to the shift to the day mode, the infrared cut filter 104 is placed on the optical path of the imaging device 100. As a result, the amount of incident light decreases as compared to that in the night mode immediately before switching to the day mode, and the gain increases accordingly. Then, in the day mode, the gain is adjusted in accordance with the brightness of the image capture environment (step S49). For example, as the image capture environment becomes brighter, the gain is reduced. After the gain reaches 0, the aperture 106 is closed in accordance with a detected value, as shown in FIG. 2B.

Determination Operation for Shift from Day Mode to Night Mode

Next, a determination operation for the shift from the day mode to the night mode of the imaging device 100 will be explained in detail with reference to FIG. 3. FIG. 3 is a flowchart showing the determination operation for the shift from the day mode to the night mode of the imaging device 100. The processing flow from the start to the end of FIG. 3 indicates one frame. A detected value and a gain are acquired once in one frame, and a state is updated.

First, a detected value (a luminance value) and a gain are acquired from an image signal (step S1). For example, an analog gain (Again) and a digital gain (Dgain) are both acquired as the gain. Next, it is determined whether or not the present state is a running state, a wait state or a check state (step S2).

When the present state is the running state in which a determination of the shift from the day mode to the night mode is performed, it is determined whether or not the gain is saturated (step S6). When the gain is not saturated, a day to night count is maintained at 0 (step S13). The day to night count is an integrated value to measure a period of time during which two conditions are satisfied, namely, when the detected value is equal to or lower than a threshold value and the gain (Again, Dgain) has reached a maximum value. When the day to night count becomes equal to or larger than a set value, the mode shifts to the night mode.

When the gain is saturated, a day to night determination threshold value of the detected value is read out (step S7), and it is determined whether or not the detected value is equal to or smaller than the day to night determination threshold value (step S8). The day to night determination threshold value is a threshold value relating to the detected value to determine whether to shift from the day mode to the night mode. When the detected value is larger than the day to night determination threshold value, the day to night count is maintained at 0 (step S13). On the other hand, when the detected value is equal to or smaller than the day to night determination threshold value, 1 is added (incremented) to the day to night count (step S9).

Then, a present day to night count is read out (step S10), and it is determined whether or not the present day to night count is equal to or larger than the set value (step S11). When the present day to night count is smaller than the set value, the running state that is presently being performed is maintained. On the other hand, when the day to night count is equal to or larger than the set value, the mode shifts to the night mode and the state is shifted to the wait state (step S12). More specifically, the mode shifts to the night mode if the two conditions are satisfied for a specified period of time, the two conditions being that the detected value becomes equal to or smaller than the threshold value and that the gain (A gain, D gain) has reached the maximum value.

The wait state is a stand-by state and continues for a few seconds (for example, two seconds) immediately after the shift to the night mode until a shift to the check state. The check state is a state in which it is determined whether or not the detected value is stable in the night mode. When it is determined in the check state that the detected value is stable, the state shifts to the running state in which it is determined whether or not to shift from the night mode to the day mode.

When it is determined at step S2 that the present state is the wait state, 1 is added (incremented) to a wait count (step S3). The wait count is an integrated value to measure a period of time during which the wait state is continued. When the wait count becomes equal to or larger than a set value, the state shifts to the check state.

Then, it is determined whether or not a present wait count is equal to or larger than the set value (step S4). When the present wait count is smaller than the set value, the wait state that is currently being performed is maintained. On the other hand, when the present wait count is equal to or larger than the set value, the state is shifted to the check state (step S5). More specifically, the wait state is maintained for a few seconds after shifting to the wait state, and after that, the state is shifted to the check state.

When it is determined at step S2 that the present state is the check state, a difference between the detected value of the present frame acquired at step S1 and the detected value of the previous frame is calculated (step S14). Then, it is determined whether or not the calculated difference is equal to or smaller than a threshold value (step S15). The threshold value here is a value to determine whether or not the detected value has significantly changed in one frame or is stable.

When the difference is equal to or smaller than the threshold value, 1 is added (incremented) to a stable count (step S16). The stable count is a value to determine whether or not the detected value is stable after the shift to the night mode. When the stable count becomes equal to or larger than a set value, the mode shifts to the running state. In the running state, it is determined whether or not to shift from the night mode to the day mode.

When the difference is larger than the threshold value, addition of the stable count is not performed because the detected value is not stable. Then, it is determined whether or not a present stable count is equal to or larger than the set value (step 17). When the present stable count is equal to or larger than the set value, a present gain is stored as the first gain value G1 (step S18). After that, the state is shifted to the running state in which it is determined whether or not to shift from the night mode to the day mode (step S19). On the other hand, when the present stable count is smaller than the set value, the check state that is presently being performed is maintained. In the check state, after the shift to the night mode, it can be determined whether or not the detected value is stable. When the detected value is stable, the determination of the shift from the night mode to the day mode is started. On the other hand, when the detected value is not stable, the determination of the shift from the night mode to the day mode is not started. Therefore, it is difficult for the night mode to return to the day mode and it is difficult for hunting to occur.

Determination Operation for Shift from Night Mode to Day Mode

Figure 4:
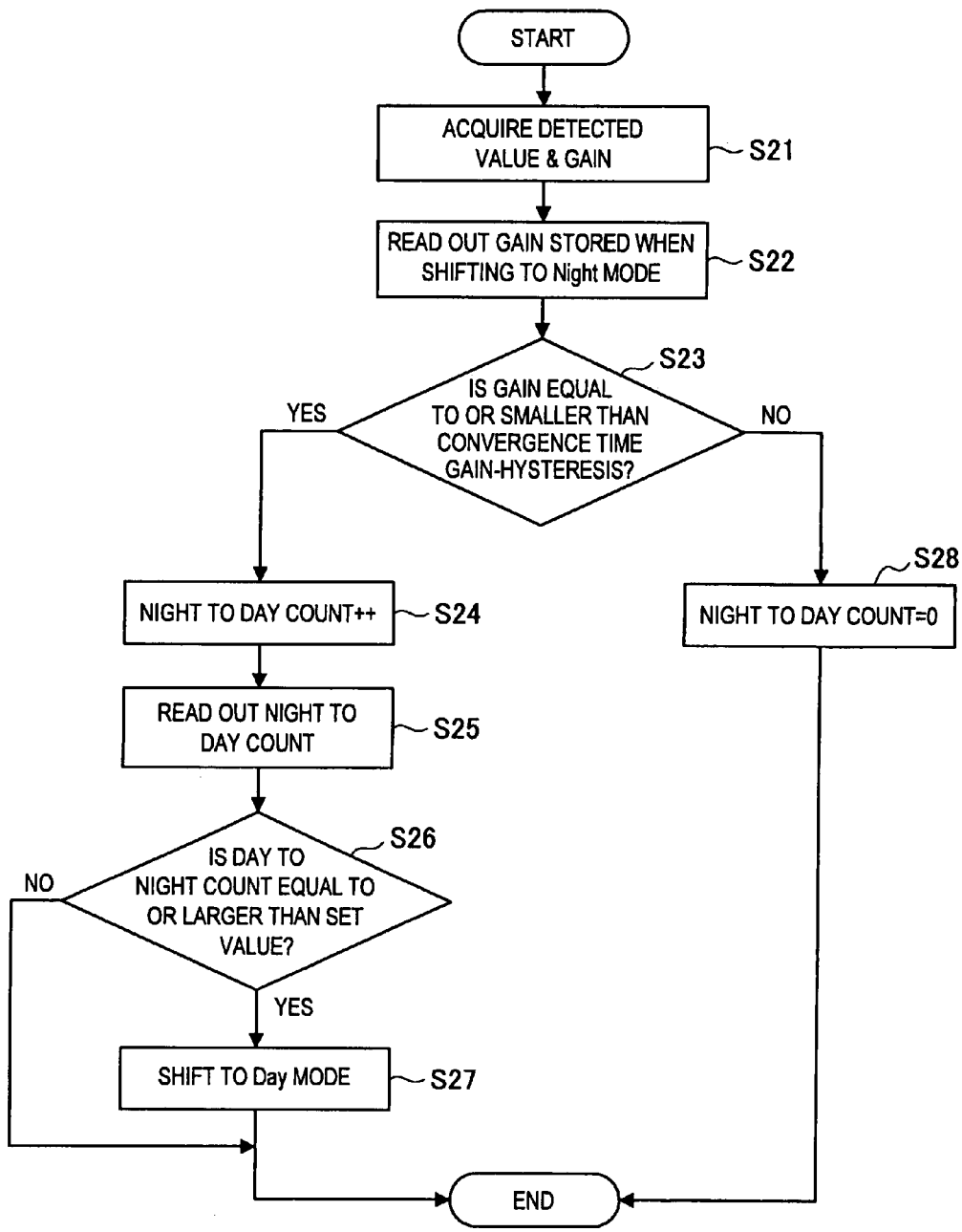
FIG. 4 is a flowchart showing a determination operation for the shift from the night mode to the day mode of the imaging device 100.

Next, a determination operation for the shift from the night mode to the day mode of the imaging device 100 will be explained with reference to FIG. 4. FIG. 4 is a flowchart showing the determination operation for the shift from the night mode to the day mode of the imaging device 100. The processing flow from the start to the end of FIG. 4 indicates one frame. A detected value and a gain are acquired once in one frame, and update of a night to day count is performed. The night to day count is an integrated value to measure a period of time during which the gain is equal to or smaller than the night to day threshold value. When the night to day count becomes equal to or larger than a set value, the mode shifts to the day mode.

First, a luminance value (a detected value) and a gain are acquired from an image signal (step S21). Then, the stored first gain value G1 is read out when shifting from the day mode to the night mode (step S22).

Next, it is determined whether or not a present gain is equal to or lower than a value (=the night to day threshold value of the gain) that is obtained by subtracting hysteresis from a gain in convergence time, namely, the first gain value G1 stored at the time of the shift to the night mode (step S23).

When the present gain is larger than the night to day threshold value, the night to day count is maintained at 0 (step S28). On the other hand, when the present gain is equal to or smaller than the night to day threshold value, 1 is added (incremented) to the night to day count (step S24). Then, a present night to day count is read out (step S25), and it is determined whether or not the present night to day count is equal to or larger than a set value (step S26).

When the present night to day count is smaller than the set value, the night mode that is presently being performed is maintained. On the other hand, when the night to day count is equal to or larger than the set value, the mode is shifted to the day mode (step S27). In this manner, the shift from the night mode to the day mode is determined based on the gain.

3. Advantageous Effects of Embodiment

As described above, according to the present embodiment, after the shift to the night mode, the irradiation intensity of the infrared LED 114 is controlled before the gain is increased to the maximum. Therefore, the S/N ratio is improved as compared to a method that controls the irradiation intensity of the infrared LED after the gain is increased to the maximum.

Further, since the shift from the night mode to the day mode is determined based on the gain, the night mode is not erroneously returned to the day mode when the light reflected by the subject that is irradiated by the infrared LED 114 increases significantly.

Next, with respect to an imaging device that has the two modes of the day mode and the night mode, a method that switches between the two modes using a method different from that of the present embodiment will be explained.

Figure 8A:
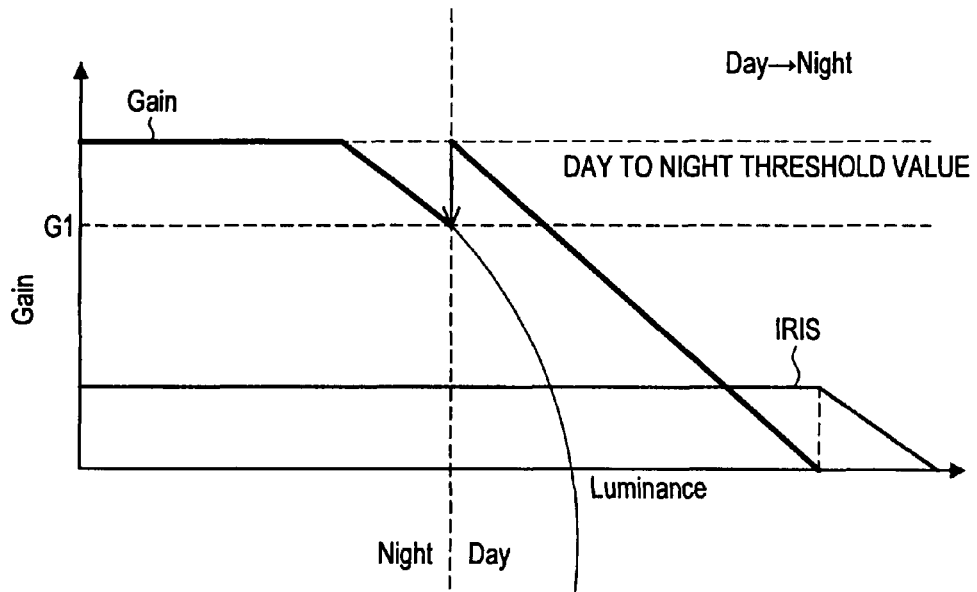
FIG. 8A and FIG. 8B are graphs each showing a relationship between a gain and an aperture, and a luminance.
Figure 8B:
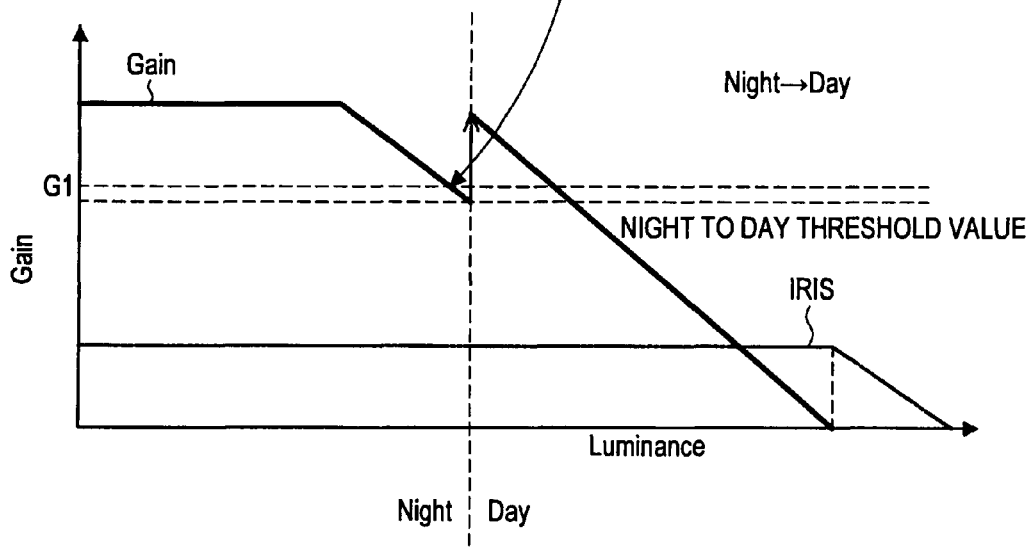

FIG. 8A and FIG. 8B each show an example of switching between the day mode and the night mode. FIG. 8A and FIG. 8B are graphs each showing a relationship between a gain and an aperture, and a luminance. FIG. 8A shows switching from the day mode to the night mode, and FIG. 8B shows switching from the night mode to the day mode.

In the example shown in FIG. 8A, the switching from the day mode to the night mode is performed based on, for example, both the detected value (the detected luminance value) and the gain. In the day mode, the imaging device adjusts the brightness of an image such that it reaches a target brightness level, by increasing the gain as the image capture environment becomes gradually darker. Then, when the image capture environment becomes darker to a certain degree, the gain is saturated. When the gain is saturated and the luminance value becomes smaller than a threshold value, the imaging device switches from the day mode to the night mode.

In the night mode, an infrared cut filter is removed and infrared light enters a CCD image sensor. Accordingly, the amount of the incident light increases as compared to that in the day mode immediately before switching to the night mode. Therefore, as shown in FIG. 8A, the gain is reduced accordingly. The imaging device stores, as the first gain value G1, the gain when the gain becomes stable by the brightness level of the image reaching the target brightness level.

The examples shown in FIG. 8A and FIG. 8B show a case in which the brightness of the image is adjusted only by the gain. After the shift to the night mode, the gain is increased as shown in FIG. 8A and the brightness of the image is thereby adjusted. In this method, the infrared irradiation function of an infrared LED or the like is not used, and the brightness of the image is adjusted only by the gain. As a result, a range in which the brightness can be controlled is narrow. Further, the S/N ratio of the image deteriorates because the gain is increased. In contrast, according to the present embodiment, the infrared irradiation function is used. Therefore, there is no need to adjust the brightness of the image using only the gain, and the range in which the brightness can be controlled is wide. In addition, it is possible to inhibit deterioration of the S/N ratio of the image.

As shown in FIG. 8B, the shift from the night mode to the day mode is determined by the gain. More specifically, the first gain value G1 stored at the time of the shift from the day mode to the night mode is caused to have hysteresis, and a value obtained by subtracting a hysteresis width from the first gain value G1 is set as a threshold value (a night to day threshold value) to shift from the night mode to the day mode. When the gain decreases and becomes smaller than the night to day threshold value, the mode shifts from the night mode to the day mode.

Figure 9A:
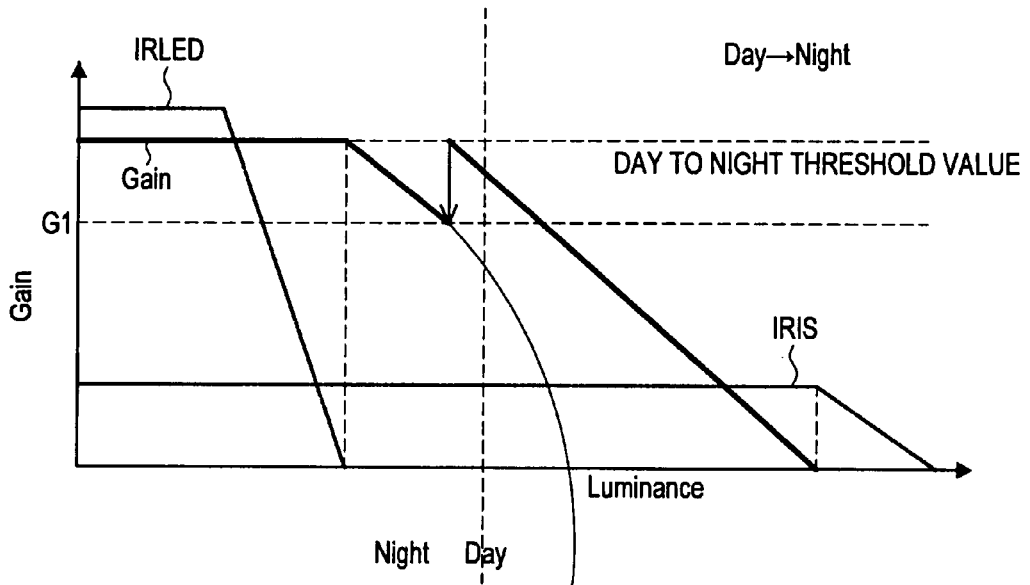
FIG. 9A and FIG. 9B are graphs each showing a relationship between a gain, an infrared LED and an aperture, and a luminance.
Figure 9B:
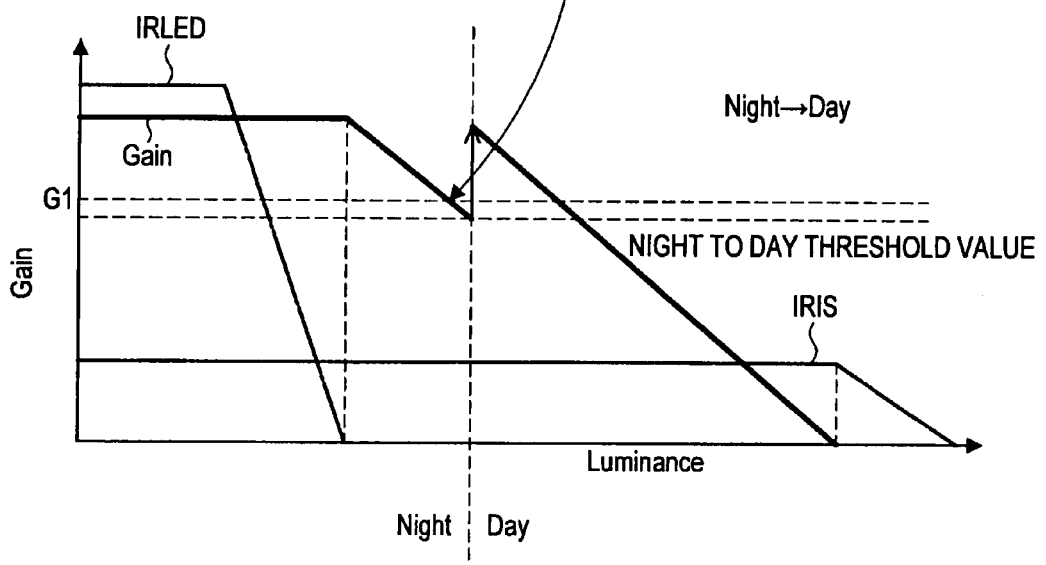

Next, FIG. 9A and FIG. 9B each show another example of switching between the day mode and the night mode. FIG. 9A and FIG. 9B are graphs each showing a relationship between a gain, an infrared LED and an aperture, and a luminance. FIG. 9A shows switching from the day mode to the night mode, and FIG. 9B shows switching from the night mode to the day mode.

The examples shown in FIG. 9A and FIG. 9B show a method in which the brightness of an image is adjusted using the infrared LED, in addition to the method explained with reference to FIG. 8A and FIG. 8B in which the brightness of the image is adjusted only by the gain.

In the examples shown in FIG. 9A and FIG. 9B, after the shift to the night mode, first, the gain is controlled in accordance not with the irradiation intensity of the infrared LED but with the brightness of an image capture environment. Then, after the gain is saturated, the irradiation intensity of the infrared LED is controlled. With this method, while the infrared LED is operating in the night mode, a maximum gain is constantly applied. Therefore, even when infrared light is irradiated onto a subject by the infrared LED, the S/N ratio of an image deteriorates.

In contrast, according to the present embodiment, after the shift to the night mode, the irradiation intensity of the infrared LED is controlled such that the brightness of an image is adjusted to reach the target brightness. Accordingly, as compared to a case in which the gain is controlled after the shift to the night mode, it is possible to improve the S/N ratio of the image.

Figure 10A:
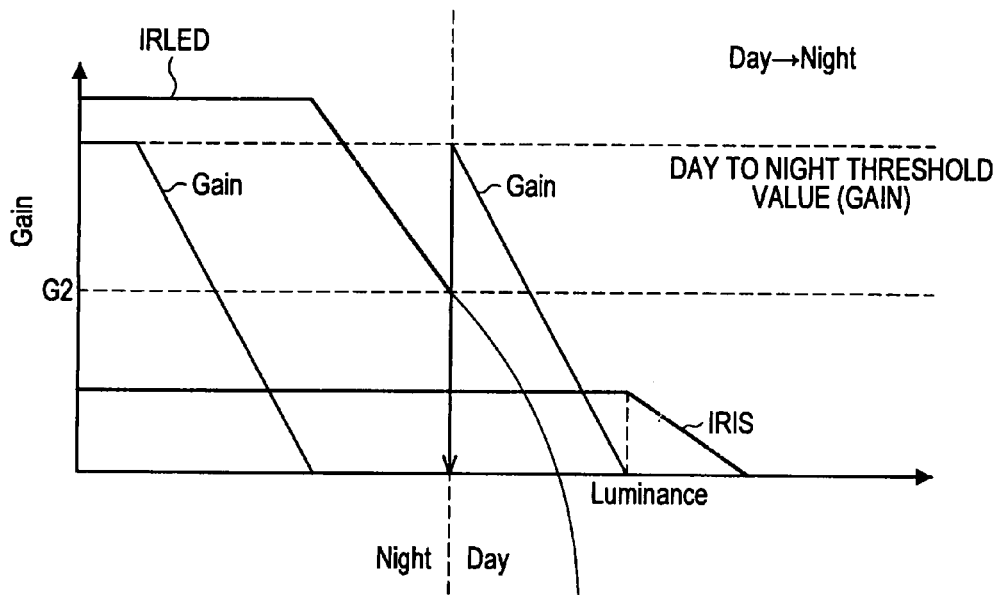
FIG. 10A and FIG. 10B are graphs each showing a relationship between a gain, an infrared LED and an aperture, and a luminance.
Figure 10B:
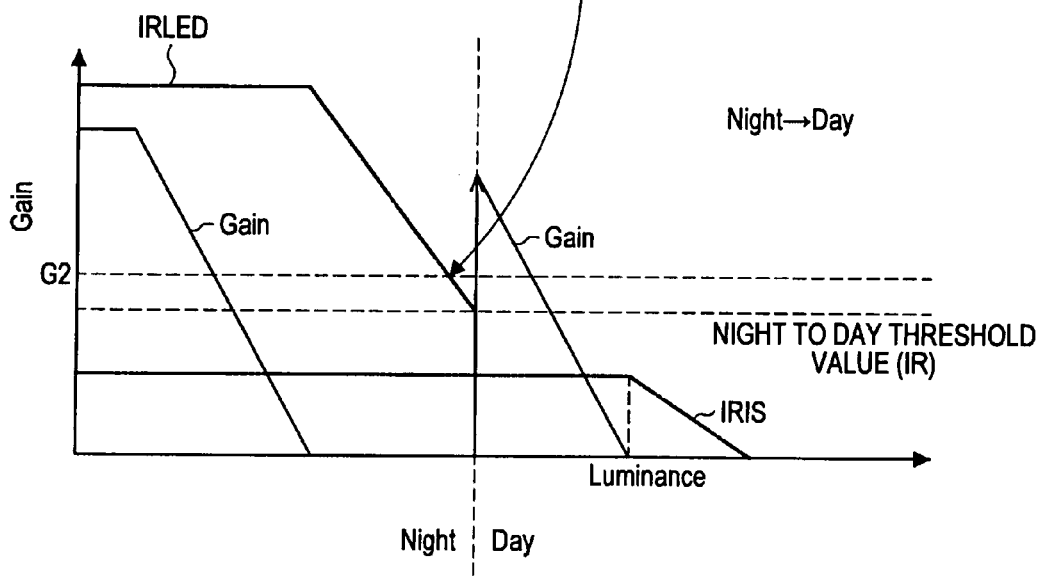

Next, FIG. 10A and FIG. 10B each show another example of switching between the day mode and the night mode. FIG. 10A and FIG. 10B are graphs each showing a relationship between a gain, an infrared LED and an aperture, and a luminance. FIG. 10A shows switching from the day mode to the night mode, and FIG. 10B shows switching from the night mode to the day mode.

The examples shown in FIG. 10A and FIG. 10B also show a case in which the brightness of an image is adjusted using the gain and the infrared LED in the night mode. In the examples shown in FIG. 10A and FIG. 10B, after the shift to the night mode, first, the gain is set to zero, and the brightness of an image is adjusted only by controlling the irradiation intensity of the infrared LED.

In response to the shift to the night mode, the infrared cut filter is removed from the optical path. After the shift from the day mode to the night mode, the brightness level of the image reaches a target brightness level, and irradiation intensity when the irradiation intensity of the infrared LED becomes stable is stored as a first irradiation intensity G2. Then, in the examples shown in FIG. 10A and FIG. 10B, the gain is controlled when the irradiation intensity of the infrared LED reaches a maximum.

As shown in FIG. 10B, the shift from the night mode to the day mode is determined based on the irradiation intensity of the infrared LED. More specifically, the first irradiation intensity G2 stored at the time of the shift from the day mode to the night mode is caused to have hysteresis, and a value obtained by subtracting a hysteresis width from the first irradiation intensity G2 is set as the threshold value (the night to day threshold value) to shift from the night mode to the day mode. When the gain decreases and becomes smaller than the night to day threshold value, the mode shifts from the night mode to the day mode.

The irradiation intensity of the infrared LED and the brightness of an image capture environment are determined using the amount of light that enters the CCD image sensor. However, the CCD image sensor cannot distinguish between visible light and infrared light. Therefore, in the night mode, if, for example, a person stands in front of the imaging device or an object moves across in front of the imaging device and the amount of reflected light of the infrared LED thereby increases significantly, it is erroneously determined that the image capture environment has become brighter. As a result, regardless of the fact that the image capture environment is dark, there are cases in which the mode shifts from the night mode to the day mode. However, after the person or the object has moved away from the front of the imaging device, the image capture environment is dark in the day mode. Therefore, the mode returns to the night mode again. In this manner, with the method shown in FIGS. 10A and 10B, the imaging device may cause hunting due to the subject.

In order to avoid the above-described problem, a method can be considered in which, separately from the CCD image sensor, a visible light sensor or the like is used to determine the brightness of the image capture environment when shifting from the night mode to the day mode. However, it is necessary to provide in the imaging device an additional sensor to determine the shift from the night mode to the day mode, resulting in an increase in cost of the imaging device.

In contrast, according to the present embodiment, the shift from the night mode to the day mode is determined not by the amount of light entering the CCD image sensor, but by the gain. Accordingly, when the amount of light reflected by the subject that is irradiated from the infrared LED 114 increases significantly, the mode does not erroneously return to the day mode The exemplary embodiment of the present embodiment is described above in detail with reference to the appended drawings. However, the present invention is not limited to the above-described examples. It should be understood by those skilled in the art that various modifications, combinations, sub-combinations and alterations may occur depending on design requirements and other factors insofar as they are within the scope of the appended claims or the equivalents thereof.

The invention claimed is:

1. An imaging device comprising:
an imaging element that receives light from a subject;
an infrared cut filter that removes an infrared region of light entering the imaging element in a day mode;
a gain control unit that controls a gain such that an image has a target brightness level; and
a control unit that switches from a night mode to the day mode when the gain becomes smaller than a threshold value, the threshold value obtained based on a difference between a first gain value and a hysteresis in the first gain value, wherein the first gain value is set when a brightness level of the image reaches the target brightness level.

2. The imaging device according to claim 1, wherein the gain control unit increases the gain when an image capture environment becomes dark.

3. The imaging device according to claim 2, wherein a mode shifts from the day mode to the night mode when the gain is saturated and a predetermined period of time has elapsed.

4. The imaging device according to claim 1, wherein the gain is increased from the first gain value until the gain is saturated and reaches a maximum when an infrared irradiation intensity reaches a maximum predetermined value and when an image capture environment is dark.

5. The imaging device according to claim 1, wherein the gain is temporarily reduced to zero when a mode switches from the day mode to the night mode.

6. The imaging device according to claim 5, wherein the gain is increased from zero and adjusted such that the brightness level of the image reaches the target brightness level.

7. The imaging device according to claim 1, wherein the gain is an analog gain or a digital gain.

8. The imaging device according to claim 1, wherein the hysteresis is generated when the first gain value is stored at a time of a switch from the day mode to the night mode.

9. An imaging device comprising:
an imaging element that receives light from a subject and converts the light to an electrical signal;
an infrared cut filter which is detachably provided on an optical path that connects the subject and the imaging element, and which removes an infrared region of light entering the imaging element;
an infrared irradiation portion that irradiates infrared light onto the subject;
a gain control portion that controls a gain such that an image has a target brightness, based on an amount of incident light entering the imaging element; and
a control portion which switches between a day mode, in which image capture is performed while the infrared cut filter is placed on the optical path, and a night mode, in which image capture is performed while the infrared cut filter is removed from the optical path, and which, immediately after shifting from the day mode to the night mode, increases an irradiation intensity of the infrared irradiation portion from zero while the gain is maintained at a first gain value, as the amount of the incident light decreases in the night mode, and which increases the gain from the first gain value when the amount of the incident light further decreases after the irradiation intensity reaches a maximum,
wherein, in the night mode, as the amount of the incident light increases, the control portion decreases the gain while the irradiation intensity of the infrared irradiation portion is maintained at the maximum, and when the amount of the incident light further increases after the gain reaches the first gain value, the control portion decreases the irradiation intensity from the maximum to zero while the gain is maintained at the first gain value.

10. The imaging device according to claim 9, wherein, in the night mode, when the amount of the incident light further increases after the irradiation intensity becomes zero, the control portion decreases the gain to a value obtained by subtracting hysteresis from the first gain value.

11. An imaging device comprising:
an imaging element that receives light from a subject and converts the light to an electrical signal;
an infrared cut filter which is detachably provided on an optical path that connects the subject and the imaging element, and which removes an infrared region of light entering the imaging element;
an infrared irradiation portion that irradiates infrared light onto the subject;
a gain control portion that controls a gain such that an image has a target brightness, based on an amount of incident light entering the imaging element; and
a control portion which switches between a day mode, in which image capture is performed while the infrared cut filter is placed on the optical path, and a night mode, in which image capture is performed while the infrared cut filter is removed from the optical path, and which, immediately after shifting from the day mode to the night mode, increases an irradiation intensity of the infrared irradiation portion from zero while the gain is maintained at a first gain value, as the amount of the incident light decreases in the night mode, and which increases the gain from the first gain value when the amount of the incident light further decreases after the irradiation intensity reaches a maximum,
wherein the control portion switches from the day mode to the night mode if two conditions are satisfied, the two conditions being that the gain is saturated and that the amount of the incident light is smaller than a value determined in advance.

12. An imaging device comprising:
an imaging element that receives light from a subject and converts the light to an electrical signal;
an infrared cut filter which is detachably provided on an optical path that connects the subject and the imaging element, and which removes an infrared region of light entering the imaging element;
an infrared irradiation portion that irradiates infrared light onto the subject;
a gain control portion that controls a gain such that an image has a target brightness, based on an amount of incident light entering the imaging element; and
a control portion which switches between a day mode, in which image capture is performed while the infrared cut filter is placed on the optical path, and a night mode, in which image capture is performed while the infrared cut filter is removed from the optical path, and which, immediately after shifting from the day mode to the night mode, increases an irradiation intensity of the infrared irradiation portion from zero while the gain is maintained at a first gain value, as the amount of the incident light decreases in the night mode, and which increases the gain from the first gain value when the amount of the incident light further decreases after the irradiation intensity reaches a maximum,
wherein the control portion switches from the night mode to the day mode when the gain decreases and becomes smaller than a value obtained by subtracting hysteresis from the first gain value.

13. An imaging device control method comprising:
in an imaging device comprising an imaging element that receives light from a subject:
switching between a day mode in which image capture is performed while an infrared cut filter, which removes an infrared region of light entering the imaging element, is placed on an optical path that connects the imaging element and the subject, and a night mode in which image capture is performed while the infrared cut filter is removed from the optical path;
increasing from zero, immediately after shifting from the day mode to the night mode, an irradiation intensity of an infrared irradiation portion that irradiates infrared light onto the subject while a gain is maintained at a first gain value, the gain controlling brightness of an image based on an amount of the incident light; and
increasing the gain from the first gain value when the amount of the incident light decreases after the irradiation intensity reaches a maximum value,
wherein a mode of image capture is switched from the night mode to the day mode when the gain decreases and becomes smaller than a value obtained by subtracting hysteresis from the first gain value.

14. The imaging device control method according to claim 13, further comprising maintaining a zero value of a day to night count when the gain is not saturated or when a luminance value of the image is greater than the threshold value.

15. The imaging device control method according to claim 14, further comprising switching to the night mode when the day to night count becomes equal to or larger than a predetermined value.

16. The imaging device control method according to claim 15, further comprising incrementing the day to night count by one, when the detected value is equal to or smaller than the threshold value.

17. A non-transitory computer readable medium having stored thereon a program having instructions being executable by a computer for causing the computer to perform steps comprising:
in an imaging device:
switching between a day mode in which image capture is performed while an infrared cut filter, which removes an infrared region of light entering the imaging element, is placed on an optical path that connects an imaging element and the subject, and a night mode in which image capture is performed while the infrared cut filter is removed from the optical path;
increasing from zero, immediately after shifting from the day mode to the night mode, an irradiation intensity of an infrared irradiation portion that irradiates infrared light onto the subject while a gain is maintained at a first gain value, the gain controlling brightness of an image based on an amount of the incident light; and
increasing the gain from the first gain value when the amount of the incident light decreases after the irradiation intensity reaches a maximum value,
wherein a mode of image capture is switched from the night mode to the day mode when the gain decreases and becomes smaller than a value obtained by subtracting hysteresis from the first gain value.

* * * * *